March 19, 1929.  H. A. SELAH  1,705,739
INSERT SOCKET FOR ANCHOR BOLTS
Filed July 6, 1923
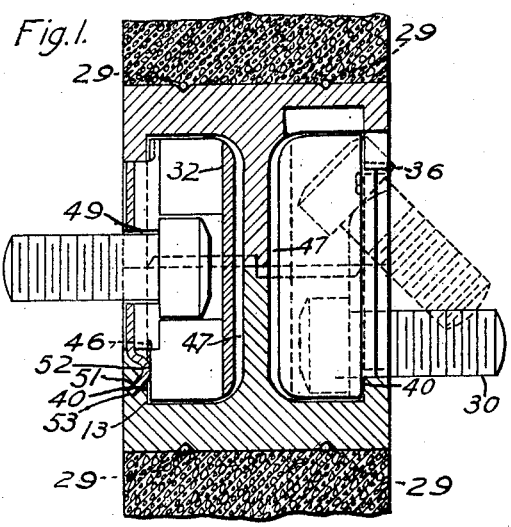
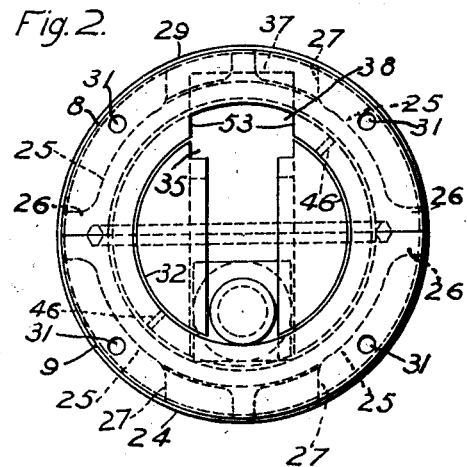
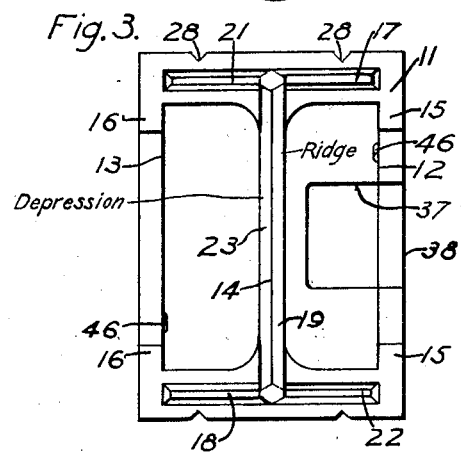
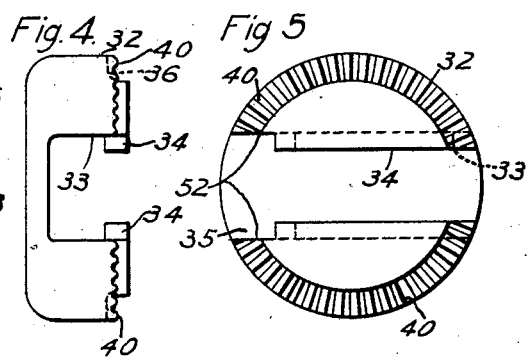
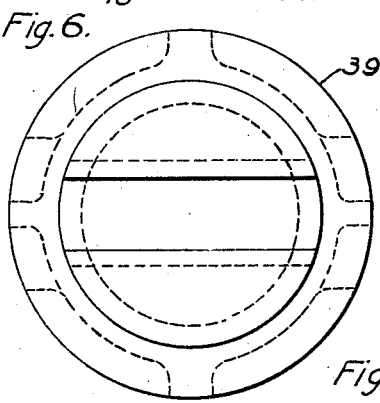
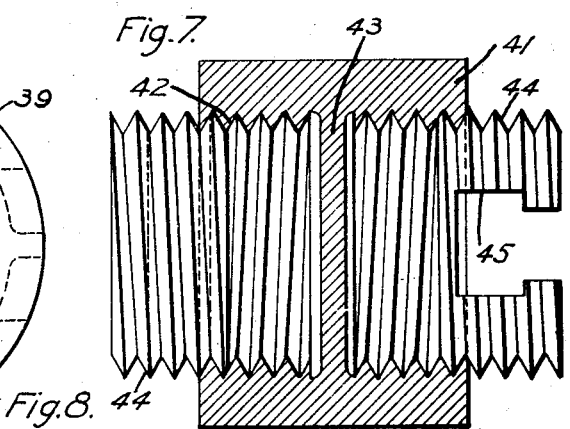
WITNESSES:
INVENTOR
Howard A. Selah.
BY
ATTORNEY Patented Mar. 19, 1929.

1,705,739

UNITED STATES PATENT OFFICE.

HOWARD A. SELAH, OF HOMEWOOD, PENNSYLVANIA, ASSIGNOR TO WESTINGHOUSE ELECTRIC & MANUFACTURING COMPANY, A CORPORATION OF PENNSYLVANIA.

INSERT SOCKET FOR ANCHOR BOLTS.

Application filed July 6, 1923. Serial No. 649,846.

My invention relates to insert sockets for anchor bolts and particularly to sockets adapted to be embedded in concrete walls and floors for retaining anchor bolts to which brackets and machine bases may be securely attached.

One object of my invention is to provide an insert socket for anchor bolts wherein provision is made for adjustment of the bolt in a plane parallel to the floor and in all directions therein within certain limits.

Another object of my invention is to provide an insert socket for anchor bolts having the above characteristics wherein the bolt may be detachably secured to the socket after the socket has been embedded in the concrete.

Another object of my invention is to provide an insert socket for anchor bolts having a pair of oppositely disposed sockets for receiving an anchor bolt and which may be embedded in a concrete partition or wall of substantially the same thickness as the insert member, whereby a flush socket is provided on each face of the wall and in which an anchor bolt may be detachably secured.

A further object of my invention is to provide an insert socket that is constituted by two interchangeable and similar members that may be cast from a single pattern and which, when placed in assembled relation, form an undercut socket for receiving an anchor bolt.

A further object of my invention is to provide an insert socket made of two complementary castings or forgings of similar construction that, when assembled, constitute a socket for receiving a rotatable anchor disc to which a bolt may be adjustably attached and which permits of rotation of the disc within the socket, whereby the bolt may be adjusted in different positions to compensate for irregularities of the spacings of bolt holes in the bracket or machine base that is to be retained by the bolts.

A further object of my invention is to provide a simple and inexpensive insert socket for anchor bolts that may economically be made of malleable iron castings and which require no machining operations and which may readily be securely embedded in a concrete wall or floor for detachably receiving an anchor bolt.

These and other objects that will be made apparent throughout the further description of my invention are attained by means of the insert socket herein described and illustrated in the accompanying drawings, wherein Figure 1 is a vertical section through an insert socket embedded in a partition wall.

Fig. 2 is a front elevational view of the insert socket illustrated in Fig. 1.

Fig. 3 is a side elevational view of one of the castings constituting a half of the insert socket illustrated in Figs. 1 and 2.

Figs. 4 and 5 are elevational and plan views, respectively, of an anchor disc constituting a part of the insert socket.

Fig. 6 is a front view of a modified form of insert socket,

Fig. 7 is a vertical section through the socket shown in Fig. 6, and

Fig. 8 is a perspective view of a locking washer used in the insert socket.

Referring to the drawings, the insert socket comprises a pair of complementary castings 8 and 9 which are identical in construction and which may be cast from the same pattern, thereby reducing to a minimum the number of patterns required to manufacture the device. Referring particularly, to Figs. 1 and 3, the complementary members each comprise a metal body portion 11 that is provided with a pair of depressions or sockets 12 and 13 that are divided by a partition wall 14. The sockets 12 and 13 are undercut as indicated in Fig. 3 and are provided with overhanging flanges 15 and 16, the purpose of which will be hereinafter described.

As indicated in Fig. 2, the members 8 and 9 are adapted to be assembled in face-to-face relation and the contiguous face of each member is provided with projecting ridges 17, 18, and 19, and corresponding depressions 21, 22 and 23 that are so disposed that the projections or ridges 17, 18 and 19 of one member fit into the depressions 21, 22 and 23, respectively, of the other member thereby constituting a seal for preventing soft concrete from entering the sockets 12 and 13 when the concrete is being poured about the insert. The ridges or projections and depressions also serve to position the members when the are placed in assembled relation.

The cylindrical surface 24 of each complementary member is provided with a plurality of depressions 25 that are disposed between ridges 26 and 27, and the ridges are provided with grooves 28 for receiving a binding wire 29 that is wrapped about the members to retain them in assembled relation while the concrete is being poured and while the insert sockets are being secured to the form which holds the sockets in position during the pouring operation. Holes 31 are provided in the front face of the inserts for the purpose of securing the insert sockets to a wooden support by means of nails that are driven through the holes into the support. The holes 31 register with the depressions 25 in the members and therefore permit of easy access for the nailing operation. It will be understood that notches may be provided in the castings instead of the holes for serving the same purpose.

As indicated in Fig. 1, an insert disc 32 illustrated in detail in Figs. 4 and 5 is inserted within sockets 12 and 13 before the members 8 and 9 are secured in assembled relation by the wire 29. The disc 32 is provided with an undercut slot 33 that extends transversely of the disc, the overhanging portion 34 of the slot being cut away at one end to provide an enlarged opening 35 for receiving the square head of a bolt 36 while the bolt is in the position indicated in dotted lines in Fig. 1. The disc is cut away on its front surface to provide a shoulder 36 that is disposed beneath flanges 15 and 16, of the insert shells or members 8 and 9 which serve to prevent removal of the disc from the members when they are in assembled relation, or after the concrete has been poured about them.

The shoulder 36 is provided with radial notches 40 for engaging radial ridges 46 on the inner face of the flanges 15 and 16 when the shoulder 36 is drawn tightly into engagement with the flanges 15 and 16 by the fastening nut (not shown). Rotation of the anchor disc 32 is thus prevented while the nut is being tightened. Sufficient space 47 is provided between the anchor disc and the partition 14 to permit the disc to be moved inwardly clear of the ridges 46 so that the disc may be rotated to any desired position. It will be understood that instead of the notches 40 and ridges 46, the shoulder 36 and inner face of the flange may be roughened to prevent rotary movement of the disc within the insert while the bolt is being tightened. However, when the bolt is off center within the insert and is projecting through the bolt hole in the base or bracket being secured to the wall, there is no tendency for the disc to rotate.

As indicated in Figs. 1, 2 and 3, each of the complementary members or shells 8 and 9 are provided with depressions or sockets 37, that open into the socket 12, and the flange 15 of the members 8 and 9 are cut away at 38 to provide a notch that registers with the depression 37 and with the opening 35 in the groove 34 of the insert disc when the disc is rotated to the position indicated in Fig. 2. The purpose of the depression 37 and notch 38 is to provide space, when the disc 32 is in the position indicated in Fig. 2, into which a bolt 30 may be inserted by first sliding it into the opening constituted by the notch 38 and opening 35, while the bolt is disposed at the angle indicated in dotted lines in Fig. 1. After the bolt has been moved to the position indicated in dotted lines, it may then be moved angularly to a position perpendicular to the outer face of the insert socket and then may be moved to the position indicated in full lines in Fig. 2.

The overhanging flanges 34 on the insert disc prevent removal of the bolt except through the openings referred to and the flanges 15 and 16 prevent removal of the insert disc from the insert shells. Because of the fact that the insert disc may be rotated within the sockets, it will be apparent that the bolt may be adjusted in every direction in the plane of the wall or floor within the limits of the edges of the flanges 15 and 16. This adjustment is of considerable advantage in the event that the bolt holes in the machine base or bracket are not properly spaced and also provides for limited adjustment of the bracket or machine base upon the wall or floor.

It will be noted that, when the two complementary shells are in assembled relation, the notch 38 of one shell will be located on the opposite side of the insert from that occupied by the notch of the other shell, and, therefore, when the insert is used for the purpose of retaining anchor bolts on opposite sides of a partition, as indicated in Fig. 1, there will be no difficulty in inserting the anchor bolt because a notch 38 and pocket 37 are provided on each side of the wall for the reception of the bolt.

In order to center the bolt within the insert socket while the sockets are being positioned upon their supports, a metal washer or disc 48 is provided having a central perforation 49 for receiving the bolt. The disc lies beneath the outer surface of the insert shell and offers no interference to the base or bracket to which the bolt is being fastened. The washer 48 is provided with a tongue 51 that extends into the notch 38 provided in the insert shell and also into the enlarged opening 35 in the disc 32 in such manner that it engages shoulders 52 on the disc and shoulders 53 on the flanges 15 and 16. The tongue prevents rotation of the disc, and, therefore, the nut may be tightened or loosened without causing the bolt to turn in the socket. Where it is found that the bolt will not be positioned in the center of the insert, the washer is removed to permit of adjustment of the bolt. Since the base or bracket prevents rotation of the insert when the bolt is off center, it is unnecessary to use the washer for preventing rotation of the bolt.

While I have illustrated the anchor socket as being applied to a partition wall, it will be understood that in the event that the insert is to be used in floors of greater thickness than the insert that only one of these sockets will be available for the reception of the anchor bolt and the concrete will flow into the innermost socket and assist in retaining the insert within the floor. However, the depressions 25 in the cylindrical surface of the insert are of sufficient depth to give ample anchorage for the insert, for in order to withdraw the insert from the concrete, it would be necessary to shear off the concrete that has flowed into the depressions 25 and to overcome the adhering action on the concrete and iron over the entire cylindrical surface of the insert.

In Figs. 6 and 7, I have shown a modified form of insert wherein the insert socket may be cast in one piece and wherein the casting 39 is provided on each side with threaded sockets 41 and 42 that are separated by a partition wall 43. An externally threaded insert disc 44, having an undercut groove 45 for receiving the head of a bolt, is adapted to be screwed to any desired position within the socket. The bolt head is first inserted in the undercut groove 45 and the disc then screwed into the socket by means of any suitable tool such as a rectangular bar that may be inserted in the slot 35. An advantage incident to this construction resides in the fact that the bolt may be adjusted longitudinally by moving the disc into or out of the socket. A further advantage resides in the fact that where the insert is used in an irregular floor and the inserts are not disposed in exactly the same plane as required for the machine base, the disc 44 may be adjusted to engage the foot of the machine base, thereby furnishing a substantial level footing or anchorage to which the base may be secured by means of a bolt fastened within the disc. It will be understood that the threads 41 are relatively coarse and may be cast without any difficulty and that no machine work is required for this construction.

While I have illustrated but two embodiments of my invention it will be apparent to those skilled in the art that various changes, modifications, substitutions, additions and omissions may be made in the apparatus illustrated without departing from the spirit and scope of my invention, as set forth in the appended claims.

I claim as my invention:

1. An insert anchor for bolts comprising a plurality of complementary parts constituting a pair of sockets when assembled and adapted to be embedded in a hardening material and a rotatable non-removable member fitting within either socket and having a transverse slot for receiving a bolt head and for supporting it in different adjusted positions.

2. An anchor for bolts comprising a member having an undercut socket therein, a rotatable, non-removable member retained within the socket and having an undercut slot extending tranversely of the axis of rotation of the member for receiving and retaining the head of a bolt in adjusted positions, the first said member having means for securing it to a support.

3. An anchor for bolts comprising a member having an undercut socket therein and a rotatable non-removable member retained within the sockets and having an undercut key-hole slot extending transversely of the axis of rotation of the member for receiving and retaining the head of a bolt in adjusted positions, the first said member having means for securing it to a support.

4. An anchor for bolts, comprising a pair of complementary parts constituting a pair of undercut sockets when combined and a rotatable member fitting within either socket and having a slot for permitting the insertion of a bolt after the socket is assembled in position and for supporting said bolt in adjusted positions.

5. An insert anchor for bolts comprising a pair of interchangeable complementary insert members constituting a pair of sockets when assembled and provided with means exteriorly thereof for securing the member in assembled relation to a support, and a member rotatably fitting in either socket for detachably receiving and retaining a bolt in different positions in a plane transverse to the axis of rotation of the rotatable member.

6. An insert anchor for bolts adapted to be embedded in a wall formed of hardening plastic material comprising a pair of complementary members adapted when assembled to constitute an anchor member having separate similar and accessible sockets in the opposite faces thereof, and a rotatable member for detachably retaining a bolt fitting within either socket and means for retaining the rotatable member within the socket.

7. In an insert anchor for bolts, the combination with a member for receiving and retaining a bolt, of a plurality of complementary members constituting an insert having oppositely disposed sockets for receiving the first member and for clamping it in assembled relation and adapted to be embedded in plastic hardening material after assembly and to be retained in assembled condition by the hardened material.

8. In an anchor for bolts, the combination with a disc member having an undercut slot cut in from one edge thereof for receiving the head of a bolt, of a member for rotatably supporting the disc and having a portion overlapping the end of the slot for preventing removal of the bolt from the slot by movement in a transverse direction.

9. In an anchor for bolts, the combination with a disc member having an undercut slot for receiving and retaining the head of a bolt, of a member having an undercut socket for receiving and retaining the member therein for rotary movement and provided with a notch for registering with the undercut slot for permitting the insertion of a bolt head after the members are in assembled relation.

In testimony whereof, I have hereunto subscribed my name this 27th day of June, 1923.

HOWARD A. SELAH.